United States Patent
Liu et al.

(10) Patent No.: US 9,190,651 B2
(45) Date of Patent: Nov. 17, 2015

(54) BUS BAR MODULE

(71) Applicant: YAZAKI CORPORATION, Minato-ku, Tokyo (JP)

(72) Inventors: Haifeng Liu, Shizuoka (JP); Yukihisa Kikuchi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/412,219

(22) PCT Filed: Jul. 8, 2013

(86) PCT No.: PCT/JP2013/068647
§ 371 (c)(1),
(2) Date: Dec. 31, 2014

(87) PCT Pub. No.: WO2014/010557
PCT Pub. Date: Jan. 16, 2014

(65) Prior Publication Data
US 2015/0180005 A1 Jun. 25, 2015

(30) Foreign Application Priority Data

Jul. 9, 2012 (JP) ................................. 2012-153327

(51) Int. Cl.
*H01M 2/20* (2006.01)
*H01M 2/10* (2006.01)
*H01R 13/447* (2006.01)

(52) U.S. Cl.
CPC ............ *H01M 2/202* (2013.01); *H01M 2/1077* (2013.01); *H01M 2/206* (2013.01); *H01R 13/447* (2013.01)

(58) Field of Classification Search
CPC .... H01R 13/447; H01M 2/202; H01M 2/206; H01M 2/1077; H01M 2/204
USPC .......................................................... 439/212
See application file for complete search history.

(56) References Cited

U.S. PATENT DOCUMENTS

| 6,275,003 B1 | 8/2001 | Marukawa et al. | |
|---|---|---|---|
| 6,911,598 B2 * | 6/2005 | Onizuka ................ | H05K 7/026 174/50 |
| 7,499,262 B1 * | 3/2009 | Darr ...................... | H01R 9/226 361/626 |

(Continued)

FOREIGN PATENT DOCUMENTS

| JP | 2001-057196 A | 2/2001 |
|---|---|---|
| JP | 2001-332235 A | 11/2001 |

(Continued)

*Primary Examiner* — Briggitte R Hammond
(74) *Attorney, Agent, or Firm* — Marvin A. Motsenbocker; Mots Law, PLLC

(57) ABSTRACT

A bus bar module (1) includes: a first module body section (3) provided with an output terminal installation section (13); a second module body section (5) detachably attached to the first module body section; an output terminal cover (19) provided to the first module body section using a hinge section (21), and configured to cover an output terminal; a cover latch section (23) provided to the output terminal cover; a cover latching section (27) to which the cover latch section of the output terminal cover is fastened; and a reinforcing section (31) configured to come into engagement with the output terminal installation section when the second module body section is installed on the first module body section, and configured to prevent deformation of the output terminal installation section.

4 Claims, 10 Drawing Sheets

(56) References Cited

U.S. PATENT DOCUMENTS

| | | | |
|---|---|---|---|
| 2001/0049055 A1 | 12/2001 | Saito | |
| 2003/0231482 A1* | 12/2003 | Naimi | B60R 16/0238 361/833 |
| 2008/0299798 A1* | 12/2008 | Yoshida | H02G 3/081 439/76.2 |
| 2011/0223466 A1* | 9/2011 | Lee | H01M 2/206 429/158 |
| 2012/0164509 A1 | 6/2012 | Ogasawara et al. | |

FOREIGN PATENT DOCUMENTS

| | | |
|---|---|---|
| JP | 2006-120488 A | 5/2006 |
| JP | 2006-269103 A | 10/2006 |
| JP | 2008-166148 A | 7/2008 |
| JP | 2009-158334 A | 7/2009 |
| JP | 2011-077031 A | 4/2011 |
| WO | 2013-005558 A1 | 1/2013 |

* cited by examiner (a)

(b)

(c)

(a)

(b)

(c)

(a)

(b)

BUS BAR MODULE

TECHNICAL FIELD

The present invention relates to a bus bar module, and particularly to one which is installed and used in a battery assembly.

BACKGROUND ART

A bus bar module 307 has been known which, as shown in FIGS. 13 and 14, includes a resin case 301 and a cover 303, and is installed and used in a battery assembly 305 (see PTL 1).

A door section (an opening and closing section) 311 is provided to the cover 303 of the bus bar module 307 by use of a hinge section 309. A latch hole 313 is provided to the door section 311. A latch claw 315 is provided to the resin case 301.

The door section 311 turns pivotally around the hinge section 309. When the door section 311 is closed (see FIG. 13), an electrode 317 is covered with the door section 311. When the door section 311 is opened (see FIG. 4), the electrode 317 is exposed to the outside.

Leaving the door section 311 opened makes it easy to connect a cable from an external apparatus to the electrode 317, and to maintain the battery assembly 305. Leaving the door section 311 closed, meanwhile, covers the electrode 317 and thereby prevents dust and the like from being attached to the electrode 317.

While the door section 311 is closed, the latch claw 315 is in engagement with the latch hole 313 of the door section 311. By the engagement, the door section 311 can be fixed and kept closed.

PTL2 can be also cited as a document related to the conventional technique.

CITATION LIST

Patent Literature

[PTL 1] Japanese Patent Application Publication No. 2001-332235
[PTL 2] Japanese Patent Application Publication No. 2009-158334

SUMMARY OF INVENTION

Technical Problem

The conventional bus bar module 307 has a problem that: when the door section 311 is closed, the rigidity of the resin case 301 on the door receiving side is highly likely to decrease; when the latch claw 315 enters the latch hole 313, the resin case 301 (its part near the latch claw 315) bends due to force which the resin case 301 receives from the door section 311; and it is accordingly difficult to align and fit the latch claw 315 with and to the latch hole 313. In other words, the problem with the conventional bus bar module 307 is that the bending of the resin case 301 (its part near the latch claw 315) displaces the latch hole 313 with respect to the latch claw 315, and accordingly makes it difficult for the latch claw (a latching section) 315 to enter the latch hole (a latch section) 313, and for the door section 311 to be fixed to its closing position.

The present invention has been made with the foregoing problem taken into consideration. An object of the present invention is to provide a bus bar module which is installed in a battery assembly for the purpose of connecting batteries of the battery assembly in series, and which makes it easy for a latch section of a hinge cover to come into engagement with a latching section of a module body section even if the rigidity of the module body section is low.

Solution to Problem

A first aspect of the present invention provides a bus bar module installed and used in a battery assembly in order to connect batteries of the battery assembly in series. The bus bar module includes: a first module body section provided with an output terminal installation section on which to install an output terminal; a second module body section detachably attached to the first module body section; an output terminal cover provided to the first module body section using a hinge section, and configured to cover the output terminal installed on the output terminal installation section; a cover latch section provided to the output terminal cover; a cover latching section provided to the output terminal installation section of the first module body section, the cover latch section of the output terminal cover being fastened to the cover latching section when the output terminal cover covers the output terminal installed on the output terminal installation section; and a reinforcing section provided to the second module body section and configured to come into engagement with the output terminal installation section when the second module body section is installed on the first module body section, and to prevent deformation of the output terminal installation section when the cover latch section is fastened to the cover latching section.

The output terminal installation section may be shaped like a plate. The reinforcing section may be shaped like a plate. The reinforcing section may be designed to overlap the output terminal installation section when the second module body section is installed on the first module body section. A direction of reaction force which the output terminal installation section receives from the output terminal cover when the cover latch section is fastened to the cover latching section may coincide with a thickness direction of each of the output terminal installation section and the reinforcing section, the thickness direction extending from the output terminal installation section to the reinforcing section.

The output terminal installation section may include an output terminal installation section body section shaped like a flat plate, and output terminal installation section ribs projecting from the output terminal installation section body section. The reinforcing section may include a reinforcing section body section shaped like a flat plate, and reinforcing section ribs projecting from the reinforcing section body section. The output terminal installation section ribs and the reinforcing section ribs may be deigned to come into contact with each other when the second module body section is installed on the first module body section.

Extending directions of at least some ribs of the output terminal installation section ribs and extending directions of at least some ribs of the reinforcing section ribs may cross each other. Parts of the at least some ribs of the output terminal installation section ribs and parts of the at least some ribs of the reinforcing section ribs may come into contact with each other when the second module body section is installed on the first module body section.

Advantageous Effects of Invention

The present invention brings about an effect of providing the bus bar module which is installed in the battery assembly for the purpose of connecting the batteries of the battery assembly in series, and which makes it easy for the latch section of the hinge cover to come into engagement with the latching section of the module body section even if the rigidity of the module body section is low.

BRIEF DESCRIPTION OF DRAWINGS

FIG. 1 is a diagram showing a schematic configuration of a bus bar module of an embodiment of the present invention in a state where a first module body section and a second module body section are separated from each other, in which FIG. 1(b) is a front view, FIG. 1(a) is a view in the IA arrow direction in FIG. 1(b), and FIG. 1(c) is a view in the IC arrow direction in FIG. 1(b).

FIG. 2 is a diagram showing a schematic configuration of the bus bar module of the embodiment of the present invention in a state where the first module body section and the second module body section are joined together and an output terminal cover is opened, in which FIG. 2(b) is a front view, FIG. 2(a) is a view in the IIA arrow direction in FIG. 2(b), and FIG. 2(c) is a view in the IIC arrow direction in FIG. 2(b).

FIG. 5 is a diagram showing the schematic configuration of the bus bar module of the embodiment of the present invention in a state where the first module body section and the second module body section are joined together and the output terminal cover is closed, in which FIG. 5(a) is a front view, and FIG. 5(b) is a view in the VB arrow direction in FIG. 5(a).

DESCRIPTION OF EMBODIMENTS

Figure 1:
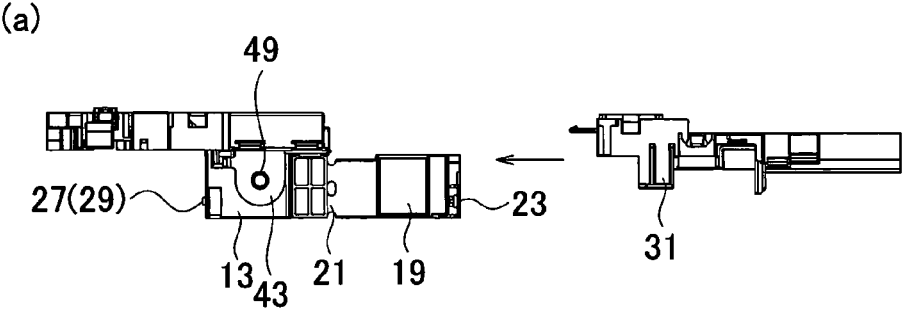
Figure 1:
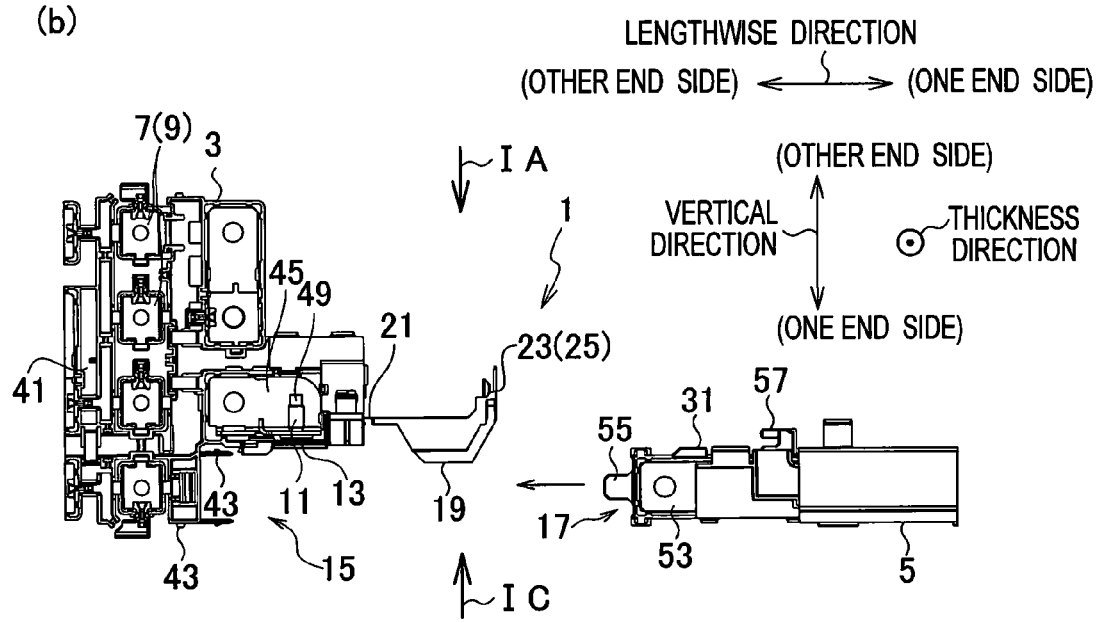
Figure 1:
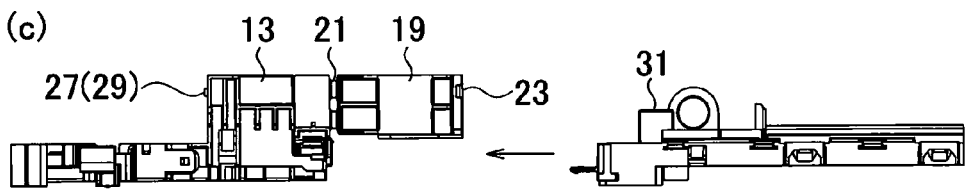

Like conventional bus bar modules, a bus bar module (battery connecting body) 1 of an embodiment of the present invention is used by being installed, for example, in a side portion of a battery assembly for the purpose of connecting batteries of the battery assembly (not illustrated in FIGS. 1 to 12) in series.

Here, for the sake of explanatory convenience, one direction of the bus bar module 1 is defined as a lengthwise direction (an X-axis direction); one direction orthogonal to the lengthwise direction is defined as a vertical direction (a Y-axis direction); and a direction orthogonal to the lengthwise and vertical directions is defined as a thickness direction (a Z-axis direction).

Each battery is shaped, for example, like an elongated rectangular parallelepiped. Plus and minus terminals project from one surface of the battery in the lengthwise direction.

The battery assembly includes the multiple batteries (cells) formed in the same shape. In the battery assembly, the lengthwise directions of the respective batteries each is one horizontal direction (the thickness direction of the bus bar module), and coincide with one another. In the battery assembly, one surface of each battery in the lengthwise direction (a surface from which the plus and minus terminals project) is located on one plane, while the opposite surface of each battery in the lengthwise direction is located in another plane. Furthermore, in the battery assembly, the batteries are arranged in the other horizontal direction orthogonal to the one horizontal direction (in the lengthwise direction of the bus bar module) in a way that each two neighboring batteries are in contact with each other or with a slight space in between. Moreover, in the battery assembly, two or more tiers each including the batteries arranged in the other horizontal direction are stacked one on another in an up-down direction (the vertical direction of the bus bar module 1) in a way that each two neighboring tiers are in contact with each other or with a slight space in between.

Thereby, when the battery assembly is viewed from the lengthwise direction of the batteries (from the side on which the plus terminals and the minus terminals project from the respective batteries), the multiple batteries are disposed in a matrix arrangement in the horizontal and up-down directions. Moreover, the plus terminals and the minus terminals of the respective batteries arranged in the other horizontal direction are disposed alternately.

The bus bar module 1 includes a first module body section 3 and a second module body section 5, as shown in FIGS. 1 to 10. Multiple metal-made flat plate-shaped bus bars 9 are integrally installed in bus bar installation sections 7 of the bus bar module 1, respectively, in a fitting manner or in the like manner.

When the bus bar module 1 is installed in the battery assembly, the bus bars 9 installed in the bus bar module 1 (the installed bus bars 9) are connected to the terminals of the batteries. Accordingly, the batteries of the battery assembly are connected in series.

The first module body section 3 is made of insulating synthetic resin and formed by injection molding, for example. The first module body 3 is provided with an output terminal installation section (an output terminal supporting section) 13 on which to install an output terminal 11.

Furthermore, the first module body section 3 is provided with a first module body section lock section 15 in addition to the output terminal installation section 13 and the bus bar installation section 7.

The output terminal 11 is integrally installed in the first module body section 3 in a way that the output terminal 11 is fitted to the first module body section 3 (the output terminal installation section 13), or in the like manner.

The output terminal 11 is formed of a conductive metal material. When the bus bar module 1 is installed in the battery assembly, the output terminal 11 comes into engagement with, and establishes electrical conduction with, a terminal (an electrode) of the endmost one of the batteries connected in series by the bus bars 9.

Like the first module body section, the second module body section 5 is formed of insulating synthetic resin, but by injection molding different from the injection molding employed for the first module body section. The second module body section 5 is detachably attached to the first module body section 3. When the second module body section 5 is installed on the first module body section 3, the first and second module body sections 3, 5 are formed into a single unit.

It should be noted that a reason for forming the first and second module body sections 3, 5 separately is to prevent the mold used to form the first and second module body sections 3, 5 from becoming larger in size. Another reason is that the unitizing of the multiple module body sections 3, 5 by dividing the bus bar module 1 makes it possible to flexibly deal with an increase in the number of batteries connected in series, for example.

The second module body section 5 is provided with a second module body section lock section 17 in addition to the bus bar installation sections 7.

When the first module body section lock section 15 and the second module body section lock section 17 are engaged with each other, the second module body section 5 is installed on the first module body section 3, and the first and second module body sections 3, 5 are formed into the single unit. The bus bars 9, the output terminal 11 and the like are installed on the single unit. Thereby, the bus bar module 1 is produced.

The bus bar module 1 is further provided with an output terminal cover (a hinge cover) 19. The output terminal cover 19 covers the output terminal 11 installed on the output terminal installation section 13. The output terminal cover 19 is provided to the first module body section 3 with a hinge section (a hinge section formed from a self-hinge which is thinner than any other section) 21. In addition, the output terminal cover 19 and the hinge section 21 are molded integrally with the first module body section 3.

The output terminal cover 19 is provided with a cover latch section 23. The cover latch section 23 is located in a position away from the hinge section 21 (for example, on an opposite side from the hinge section 21).

The output terminal cover 19 is shaped like a box. The hinge section 21 is provided near one side of a rectangular opening of the box-shaped output terminal cover 19. The linear hinge section 21 is located in a position away by a predetermined distance from the output terminal installation section 13 of the first module body section 3. When the output terminal cover 19 is turned around the hinge section 21 by 180 degrees, for example, the output terminal cover 19 turns between a position (a covering position, see FIG. 7 and the like) at which the output terminal cover 19 covers the output terminal (the installed output terminal) 11 installed on the output terminal installation section 13 of the first module body section 3 and a position (an uncovering position, see FIG. 4 and the like) at which the installed output terminal 11 is uncovered in a way that the output terminal 11 is exposed to the outside.

The cover latch section 23 of the output terminal cover 19 is provided on a different side of the output terminal cover 19 which is opposed to the side near which the hinge 21 is provided (the one side of the rectangular opening of the box-shaped output terminal cover 19). For example, the cover latch section 23 is formed from a through-hole (a through-hole penetrating through a side portion of the box-shaped output terminal cover 19) 25 provided near the different side.

The output terminal installation section 13 of the first module body section 3 is provided with a cover latching section 27. The cover latching section 27 is that to which the cover latch section 23 is fastened when the output terminal cover 19 covers the installed output terminal 11.

When the output terminal cover 19 is located in the covering position, the output terminal cover 19 is fixed at the covering position with the cover latch section 23 of the output terminal cover 19 fastened to the cover latching section 27 of the first module body section 3. To put it in more detail, for example, the cover latching section 27 of the first module body section 3 is formed from a projection 29 which is formed on the output terminal installation section 13 of the first module body section 3 (on its portion opposite from the position provided with the hinge section 21 across the center of the output terminal installation section 13).

Furthermore, when the output terminal cover 19 is located in the covering position, the cover latch section 23 of the output terminal cover 19 is fastened to the cover latching section 27 of the first module body section 3 with the projection 29 of the cover latching section 27 entering the through-hole 25 of the cover latch section 23.

The second module body section 5 is provided with a reinforcing section (an output terminal installation section reinforcing section) 31. The reinforcing section 31 comes into engagement with the output terminal installation section 13 when the second module body section 5 is installed on the first module body section 3, and prevents the deformation of the output terminal installation section 13 when the cover latch section 23 is fastened to the cover latching section 27. In other words, when the second module body section 5 is installed on the first module body section 3, the reinforcing section 31 comes into engagement with, and accordingly supports, the output terminal installation section 13. Thereby, the reinforcing section 31 makes the output terminal installation section 13 less likely to deform.

Furthermore, when the cover latch section 23 of the output terminal cover 19 is fastened to the cover latching section 27 of the first module body section 3 for the purpose of locating the output terminal cover 19 in the covering position instead of in the uncovering position, elastic deformation of the output terminal installation section 13 is virtually avoided due to reaction force which the output terminal installation section 13 receives from the output terminal cover 19 (even if the elastic deformation occurs, the amount of the elastic deformation is negligible and ignorable).

This almost prevents the displacement of the cover latching section 27 of the output terminal installation section 13 with respect to the cover latch section 23 of the output terminal cover 19 (i.e., makes the amount of the displacement fall within an allowable value range), and accordingly avoids occurrence of a situation in which the cover latch section 23 and the cover latching section 27 fail or encounter a difficulty in coming into engagement with each other.

Moreover, the output terminal installation section 13 is shaped like a plate (for example, a flat plate). The reinforcing section 31 is also shaped like a plate (for example, a flat plate). In addition, the reinforcing section 31 is designed to overlap the output terminal installation section 13 when the second module body section 5 is installed on the first module body section 3.

The output terminal 11 is disposed on an opposite side of the output terminal installation section 13 from the side where the reinforcing section 31 overlaps the output terminal installation section 13. The output terminal cover 19 covers the installed output terminal 11 on the opposite side of the output terminal installation section 13 from the side where the reinforcing section 31 overlaps the output terminal installation section 13.

The direction of the reaction force which the output terminal installation section 13 receives from the output terminal cover 19 when the cover latch section 23 is fastened to the cover latching section 27 is designed to coincide with the thickness direction of each of the output terminal installation section 13 and the reinforcing section 31, the direction extending from the output terminal installation section 13 to the reinforcing section 31 (i.e., the vertical direction of the bus bar module 1, which extends to one end side from the other end side). It should be noted that the coincidence of the two directions means that the two directions virtually coincide with each other, and includes a range within which the two directions can be regarded as coinciding with each other.

The output terminal installation section 13 includes: an output terminal installation section body section 33 shaped like a flat plate; and output terminal installation section ribs 35 projecting from the output terminal installation section body section 33. The reinforcing section 31 includes: a reinforcing section body section 37 shaped like a flat plate; and reinforcing section ribs 39 projecting from the reinforcing section body section 37.

Furthermore, the output terminal installation section ribs 37 and the reinforcing section ribs 39 are designed to come into contact with each other when the second module body section 5 is installed on the first module body section 3 (see FIGS. 11(a) and 11(b)).

To put it in more detail, while the second module body section 3 is installed on the first module body section 5, the output terminal installation section ribs 37 project from the output terminal installation section body section 33 toward the reinforcing section 31; the reinforcing section ribs 39 project from the reinforcing section body section 37 toward the output terminal installation section 13; and the flat-shaped tip ends of the output terminal installation section ribs 35 are in contact with the flat-shaped tip ends of the reinforcing section ribs 39, respectively. In other words, the output terminal installation section ribs 35 and the reinforcing section ribs 39 are interposed between the plate-shaped output terminal installation section body section 33 and the plate-shaped reinforcing section body section 37.

In addition, the extending directions of at least some ribs of the output terminal installation section ribs 35 the extending directions of at least some ribs of the reinforcing section ribs 39 cross (for example, are orthogonal to) each other.

Furthermore, parts of the at least some ribs of the output terminal installation section ribs 35 and parts of the at least some ribs of the reinforcing section ribs 39 are designed to come into contact with each other when the second module body section 5 is installed on the first module body section 3.

For example, the extending directions of the some ribs 35A of the output terminal installation section ribs 35 coincide with the thickness direction of the bus bar module 1, while the extending directions of some ribs 39A of the reinforcing section ribs 39 coincide with the lengthwise direction of the bus bar module 1, as shown in FIG. 11(a).

In addition, some ribs 35A of the output terminal section ribs 35 and some ribs 39A of the reinforcing section ribs 39 are designed to come into contact with each other at respective intersections when the second module body section 5 is installed on the first module body section 3.

Further descriptions will be provided for the bus bar module 1.

The first module body section 3 includes a board-shaped portion 41 shaped almost like a flat plate. The bus bar installations sections 7 are formed in the board-shaped portion 41.

Figure 4:
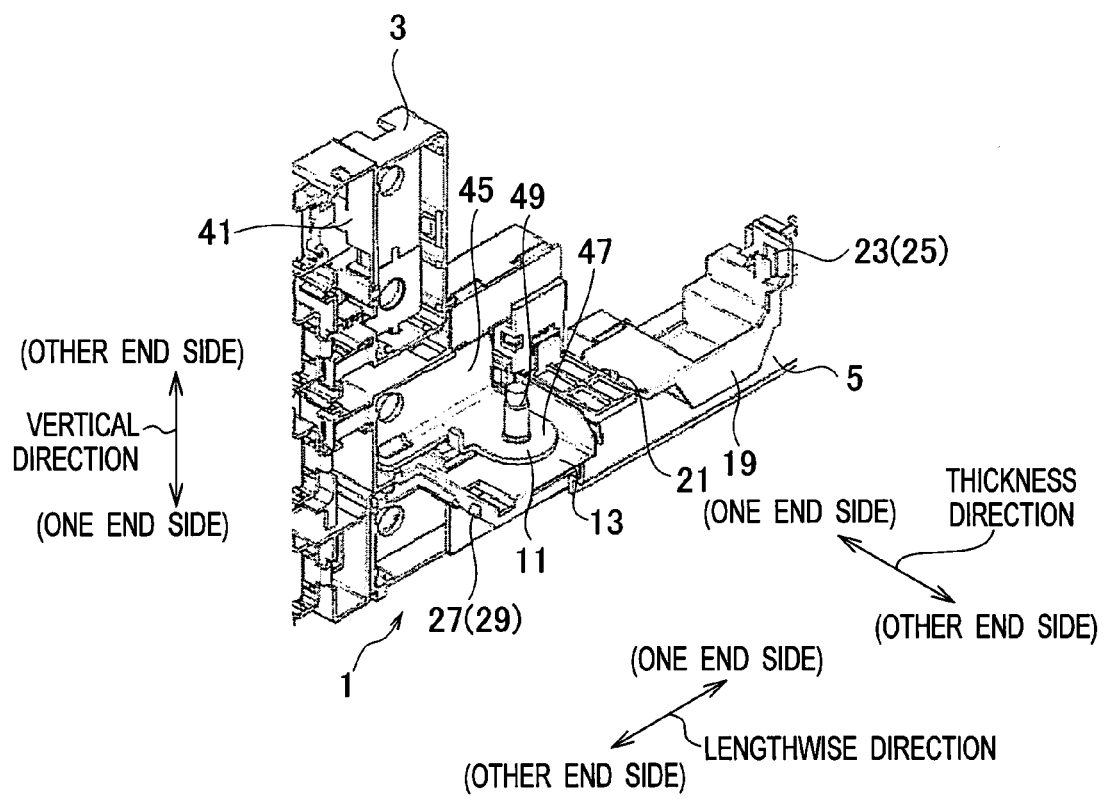
FIG. 4 is a perspective view of the schematic configuration shown in FIG. 2, which is viewed from another viewpoint.
Figure 5:
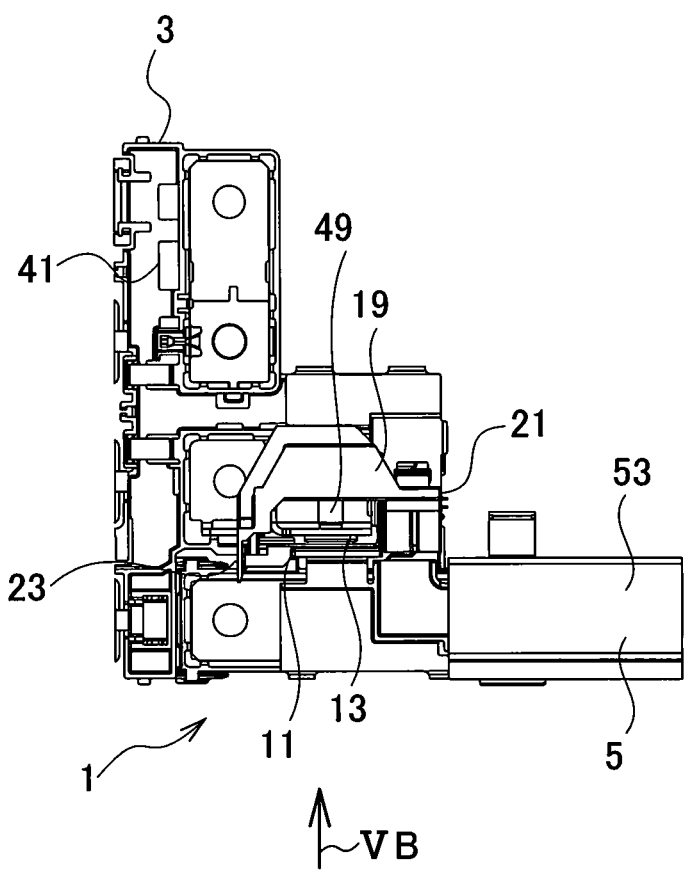
Figure 5:
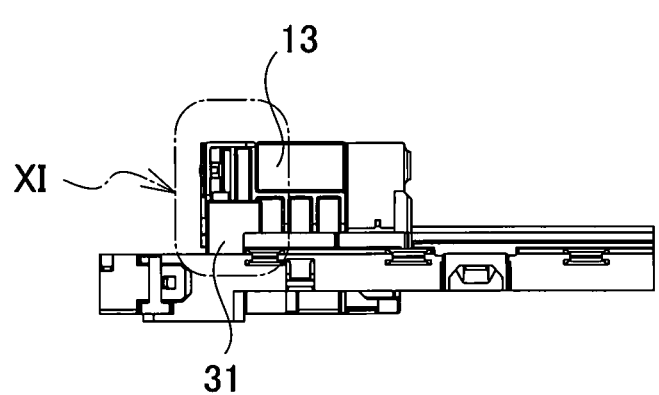
Figure 6:
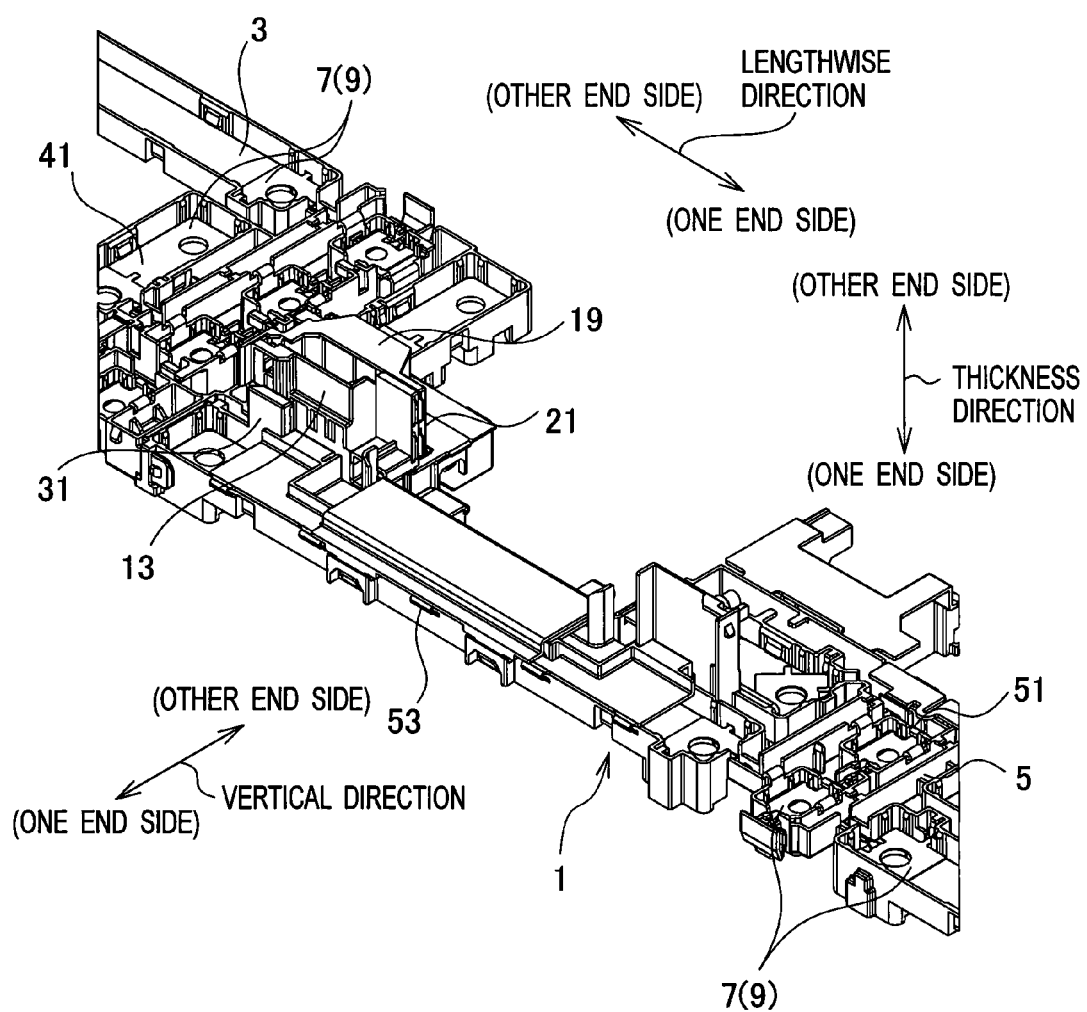
FIG. 6 is a perspective view of the schematic configuration shown in FIG. 5.

As shown in FIG. 4 and the like, the first module body section lock section 15 is provided in a part which is one end portion of the board-shaped portion 41 in the lengthwise direction, and which is on one end side of the board-shaped portion 41 in the vertical direction.

The first module body section lock section 15 is formed from: a pair of lock claws 43 projecting from one end of the board-shaped portion 41 in the lengthwise direction; and two recessed portions (not illustrated). One of the two recessed portions is provided between the pair of lock claws 43.

The output terminal installation section 13 is provided on a part which is one end portion of the board-shaped portion 41 in the lengthwise direction, which is a middle portion of the board-shaped portion 41 in the vertical direction, and which is the other of the two recessed portion of the first module body section lock section 15. Furthermore, the output terminal installation section 13 shaped like a plate projects from the board-shaped portion 41 to the other end side in the thickness direction. Moreover, the thickness direction of the plate-shaped output terminal installation section 13 coincides with the vertical direction. The output terminal installation section ribs 35 project from the output terminal installation section body section 37 to the one end side in the vertical direction.

The hinge section 21 is provided to one end of the output terminal installation section 13 in the lengthwise direction. A bend line of the hinge section 21 for the output terminal cover 19 (a line on which the output terminal cover 19 is turned) extends in the thickness direction of the bus bar module 1.

When located in the uncovering position, the output terminal cover 19 projects from one end of the hinge section 21 in the lengthwise direction of the bus bar module 1, and is opened to the other end side in the vertical direction thereof.

The cover latching section 27 is provided to the other end of the output terminal installation section 13 in the lengthwise direction of the bus bar module 1. When the output terminal cover 19 is located in the uncovering position, the cover latch section 23 is provided near one end of the output terminal cover 19 in the lengthwise direction of the bus bar module 1.

The output terminal 11 is shaped like the letter L by folding a flat plate-shaped material at one place at 90 degrees, and accordingly includes a first portion 45 shaped like a flat plate and a second portion 47 shaped like a flat plate.

A male screw 49 projects from the second portion 47. The male screw 49 projects toward the first portion 45 in the thickness direction of the second portion 47.

While the output terminal 11 is installed on the output terminal installation section 13, the second portion 47 is in engagement with the output terminal installation section 13; the thickness direction of the second portion 47 coincides with the vertical direction of the bus bar module 1; and the male screw 49 projects from the second portion 47 to the other end side in the vertical direction. Furthermore, while the output terminal 11 is installed on the output terminal installation section 13, the first portion 45 is in engagement with the board-shaped portion 41; and the thickness direction of the first potion 45 coincides with the thickness direction of the bus bar module 1.

Furthermore, when the bus bar module 1 is installed in the battery assembly, the first portion 45 is connected to a terminal of the battery assembly by use of a bolt (not illustrated) or the like, and the terminal of a cable of another apparatus is connected to the male screw 49. In this respect, the terminal of the cable can be easily connected to the male screw 49 because the connection of the terminal of the cable to the male screw 49 can be achieved from above.

Figure 7:
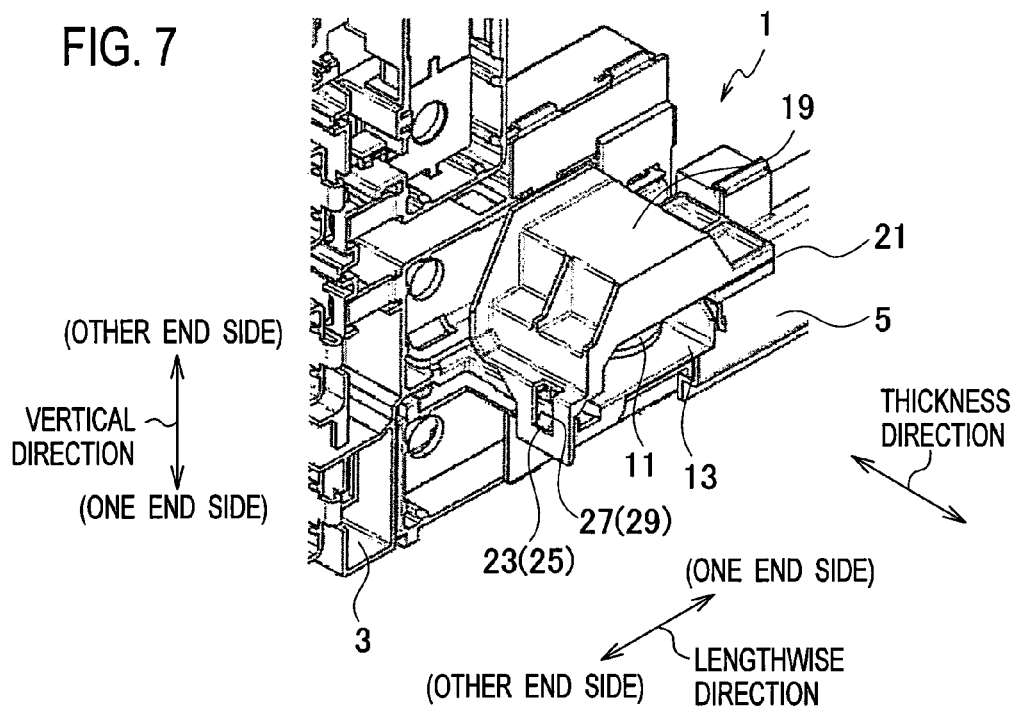
FIG. 7 is a perspective view of the schematic configuration shown in FIG. 5, which is viewed from another viewpoint.
Figure 8:
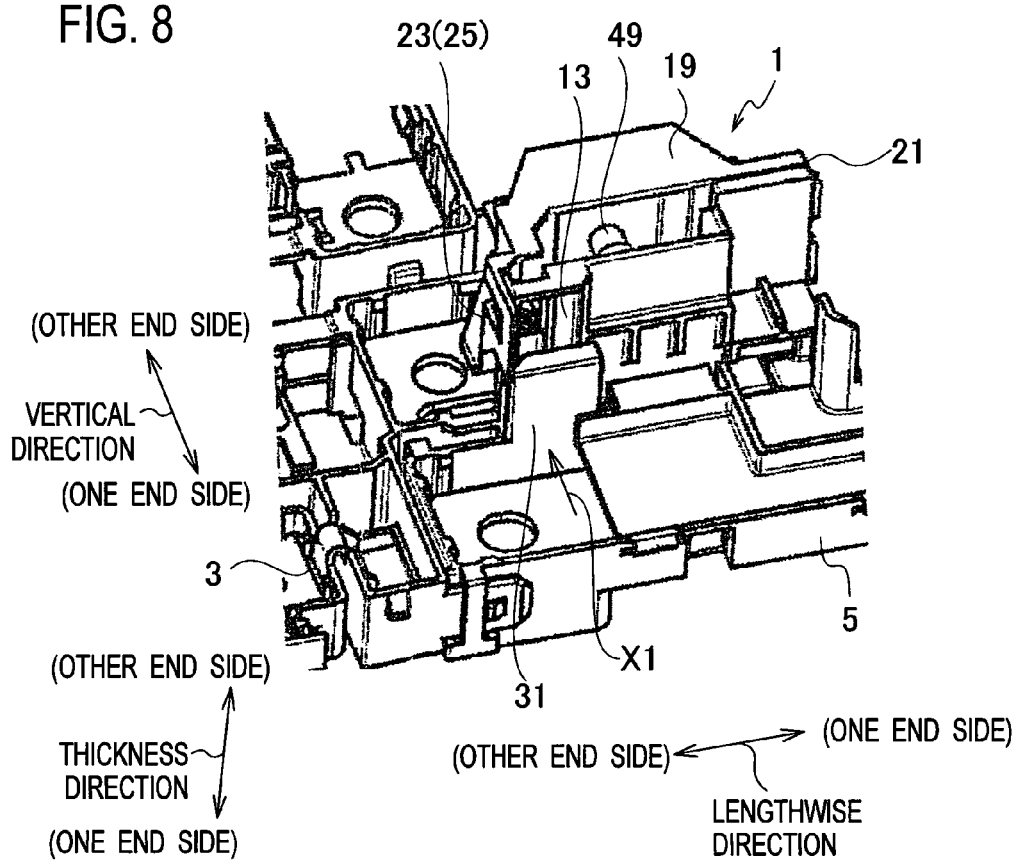
FIG. 8 is a perspective view of the schematic configuration shown in FIG. 5, which is viewed from yet another viewpoint.
Figure 9:
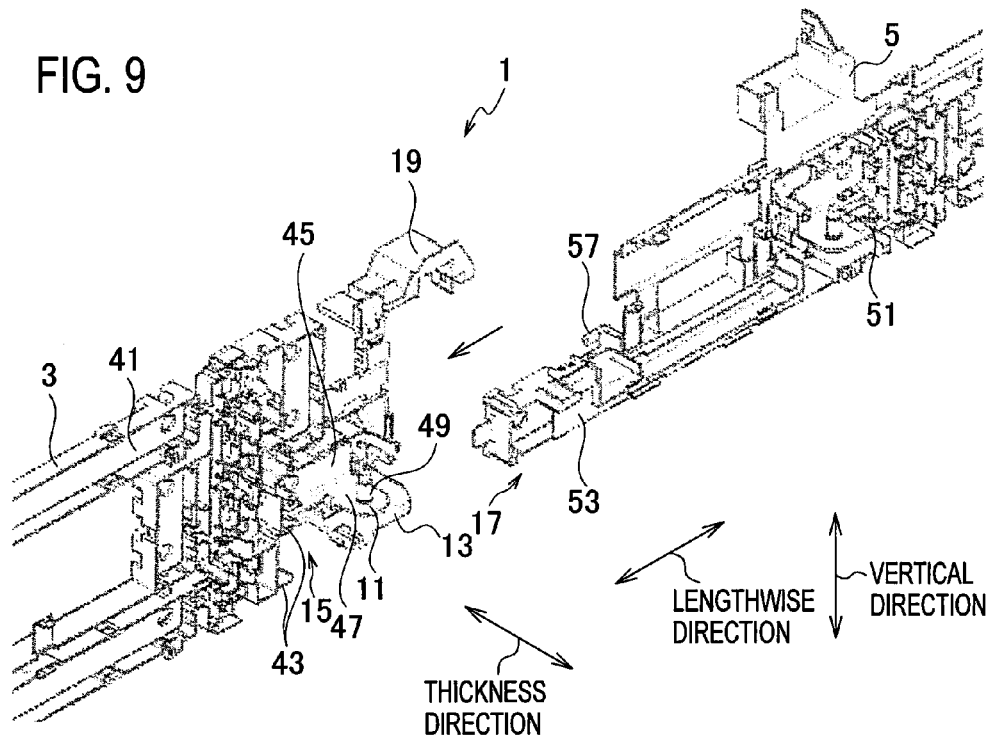
FIG. 9 is a perspective view showing the schematic configuration of the bus bar module of the embodiment of the present invention in the state where the first module body section and the second module body section are separated from each other.
Figure 10:
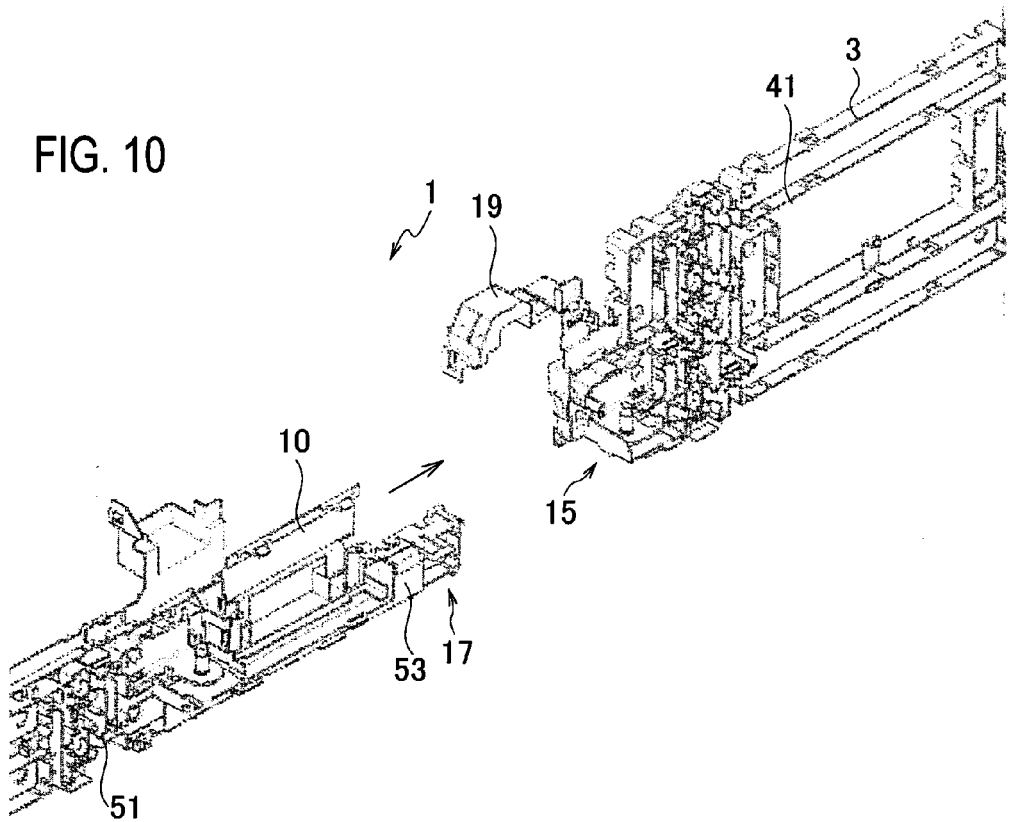
FIG. 10 is a perspective view of the schematic configuration shown in FIG. 9, which is viewed from another viewpoint.

When the output terminal cover 19 comes to be located in the covering position after leaving the uncovering position and turning on the hinge section 21 by 180 degrees, the output terminal cover 19 projects from the hinge section 21 to the other end side in the lengthwise direction, and is opened to the one end side in the vertical direction, as shown in FIG. 7 and the like. The opening of the output terminal cover 19, however, is covered with the output terminal installation section 13.

Furthermore, when located in the covering position, the output terminal cover 19 covers the installed output terminal 11 (the first portion 45 and the male screw 49).

The second module body section 5 includes: a board-shaped portion 51 shaped almost like a flat plate; and a projecting portion 53. The projecting portion 53 projects from the other end portion of the board-shaped portion 41 in the lengthwise direction, and is provided to one end portion of the board-shaped portion 51 in the vertical direction. Multiple bus bar installation sections 7 are formed in the board-shaped portion 51.

The second module body section lock section 17 is provided in a part which is the other end portion of the board-shaped portion 51 in the lengthwise direction, and which is on one end side of the board-shaped portion 51 in the vertical direction.

To put it in more detail, the second module body section lock section 17 is formed from: a portion of the projecting portion 53 on the other end side in the lengthwise direction; a small projection 55 projecting from the other end of the projecting portion 53; and another small projection 57.

In addition, the pair of lock claws 43 are designed to elastically deform in a way that the space between the lock claws 43 becomes wider as the lock claws 43 are pushed by the projecting portion 53 while the second module body section 5 is in the process of being installed on the first module body section 3 by starting with a condition shown in FIG. 1, and being moved toward the first module body section 3 in arrow directions.

Once the installation of the second module body section 5 on the first module body section 3 is completed, the pair of lock claws 43 recover their original shapes. This prevents the second module body section 3 from coming off the first module body section 5. In addition, the small projection 55 of the second module body section 5 is fitted into one of the recessed portions of the first module body section 3, while the other small projection 57 of the second module body section 5 is fitted into the other of the recessed portions of the first module body section 3.

Figure 2:
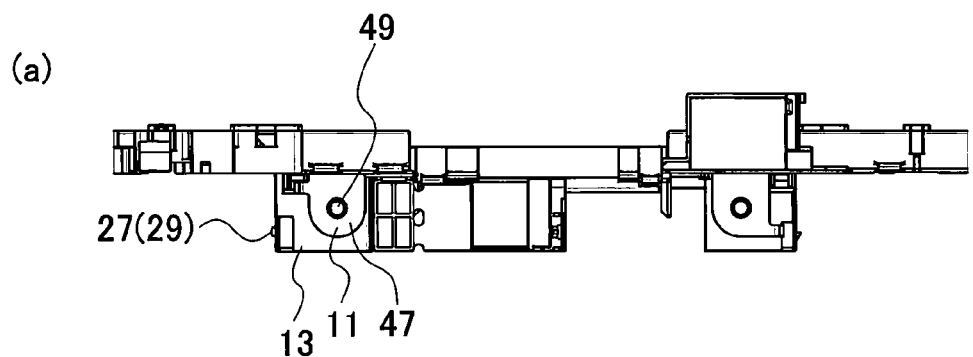
Figure 2:
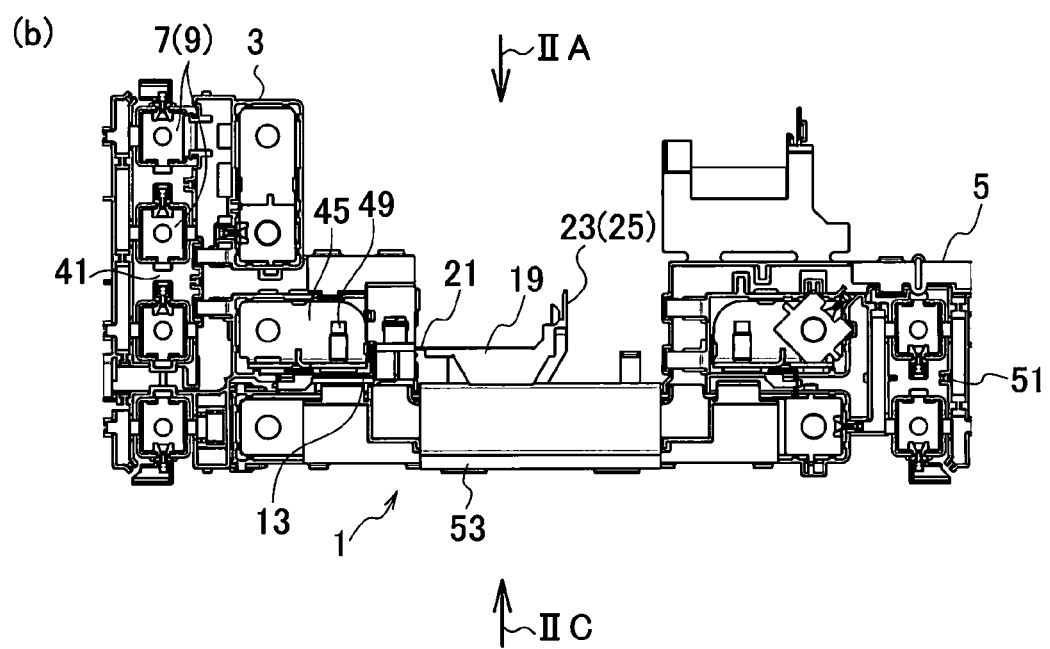
Figure 2:
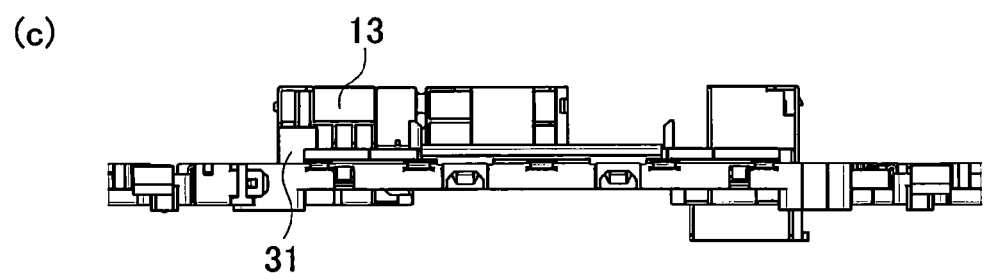
Figure 3:
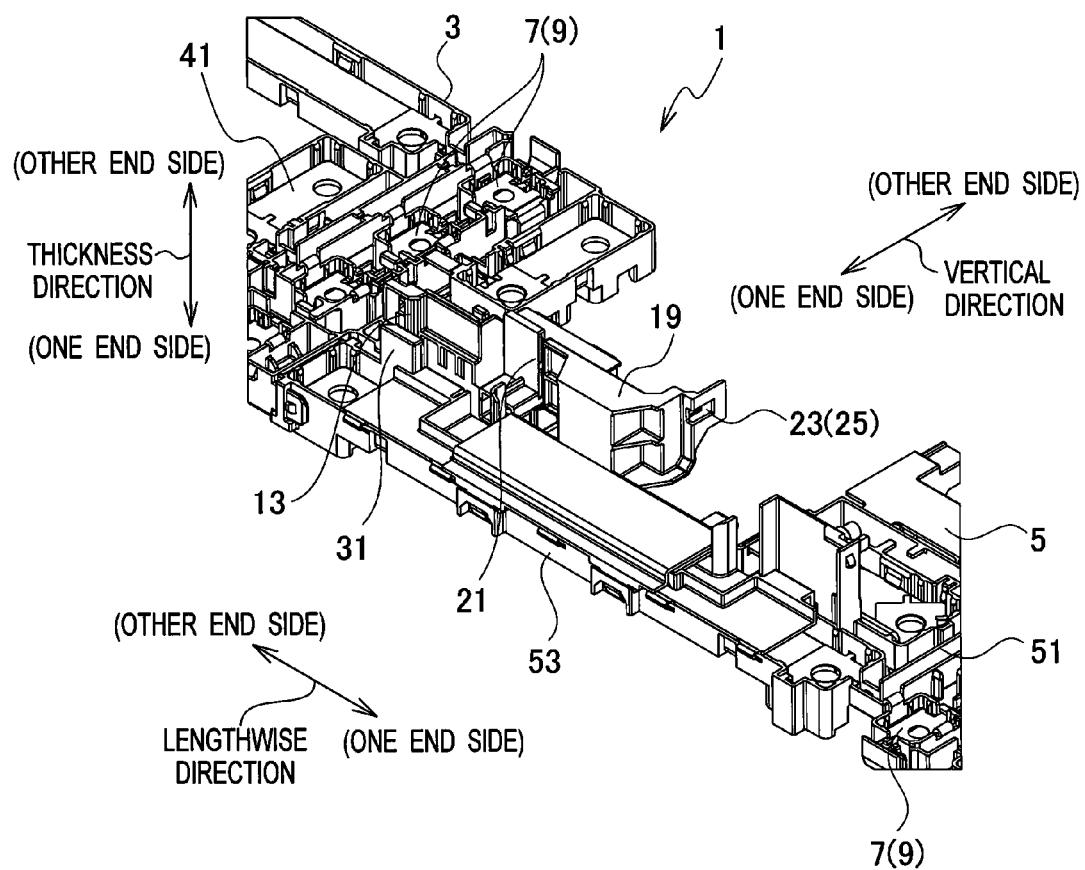
FIG. 3 is a perspective view of the schematic configuration shown in FIG. 2.

Once, starting with the condition shown in FIG. 1, the second module body section 5 is installed on the first module body section 3, the bus bar module 1 establishes a condition shown in FIG. 2 and the like. In this respect, let us assume that in the condition shown in FIG. 1, the bus bars 9 are installed in the module body sections 3, 5, and the output terminal 11 is installed on the first module body section 3. Furthermore, in the condition shown in FIG. 2, the output terminal cover 19 is located in the uncovering position.

Subsequently, the bus bar module 1 is installed in the battery assembly, and a terminal of another apparatus is connected to the male screw of the output terminal.

Thereafter, the output terminal cover 19 is turned on the hinge section 21 by 180 degrees, and is thereby located in the covering position, as shown in FIGS. 5 to 8.

The bus bar module 1 makes it easier for the cover latch section 23 of the output terminal cover 19 to come into engagement with the cover latching section 27 of the output terminal installation section 13 when the cover latch section 23 of the output terminal cover 19 is fastened to the cover latching section 27 of the output terminal installation section 13 provided in the first module body section 3, even though the rigidity of the first module body section 3 is low. This is because the second module body section 5 is provided with the reinforcing section 31 configured to prevent the deformation of the output terminal installation section 13.

Furthermore, the bus bar module 1 can prevent the deformation of the output terminal installation section 13 without making the thickness dimensions of the output terminal installation section 13 or the reinforcing section 31 become larger, since: the output terminal installation section 13 is shaped like a plate; the reinforcing section 31 is shaped like a plate; the reinforcing section 31 overlaps the output terminal installation section 13 when the second module body section 5 is installed on the first module body section 3; and the direction of the reaction force which the output terminal installation section 13 receives from the output terminal cover 19 when the cover latch section 23 is fastened to the cover latching section 27 coincides with the thickness direction of each of the output terminal installation section 13 and the reinforcing section 31. Accordingly, the bus bar module 1 makes it easier for the cover latch section 23 of the output terminal 11 to come into engagement with the cover latching section 27 of the output terminal installation section 13.

Moreover, the bus bar module 1 can increase values representing the second moments of area of the cross sections of the output terminal installation section 13 and the reinforcing section 31 when the output terminal installation section 13 and the reinforcing section 31 overlap each other, since the output terminal installation section ribs 35 (35A) and the reinforcing section ribs 39 (39A) are designed to come into contact with each other when the second module body section 5 is installed on the first module body section 3. Accordingly, the bus bar module 1 can prevent the deformation of the output terminal installation section 13 more effectively, and makes it much easier for the cover latch section 23 of the output terminal cover 19 to come into engagement with the cover latching section 27 of the output terminal installation section 13.

Figure 11:
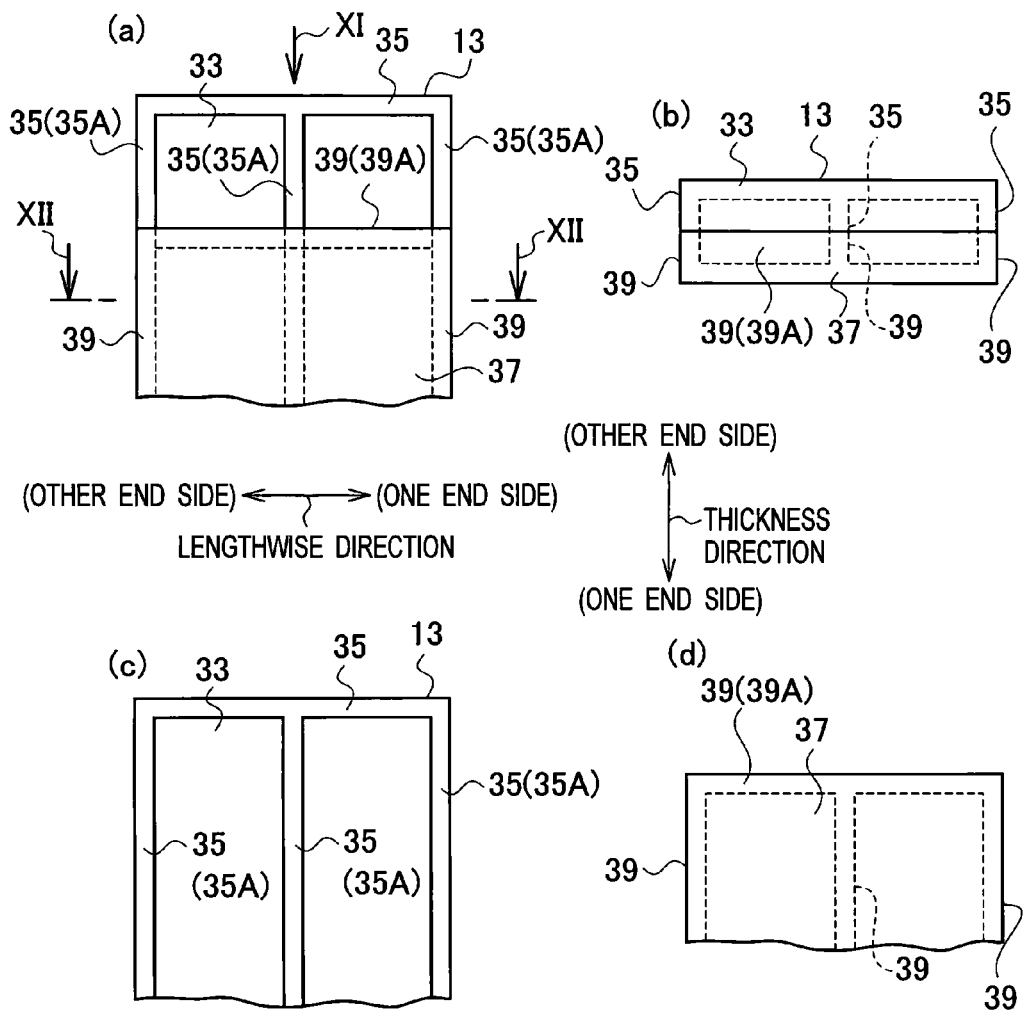
FIG. 11(a) is a diagram schematically showing a XI part in FIG. 5(b), which corresponds to a diagram schematically showing the schematic configuration of FIG. 8 viewed in the XI arrow direction.
FIG. 11(b) is a diagram of FIG. 11(a) viewed in the XI arrow direction.
FIG. 11(c) is a diagram showing only a terminal installation section by removing a reinforcing section from the FIG. 11(a)
FIG. 11(d) is a diagram showing only the reinforcing section by removing the terminal installation section from FIG. 11(a).
Figure 12:
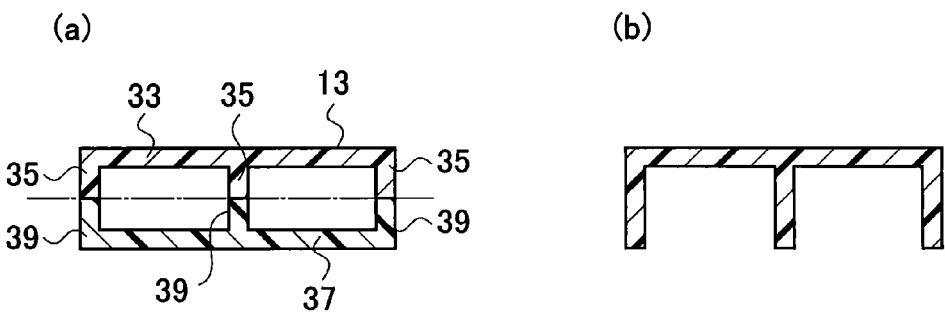
FIG. 12(a) is a diagram showing a XII-XII cross section in FIG. 11(a)
FIG. 12(b) is a diagram showing a comparative example with FIG. 12(a).
Figure 13:
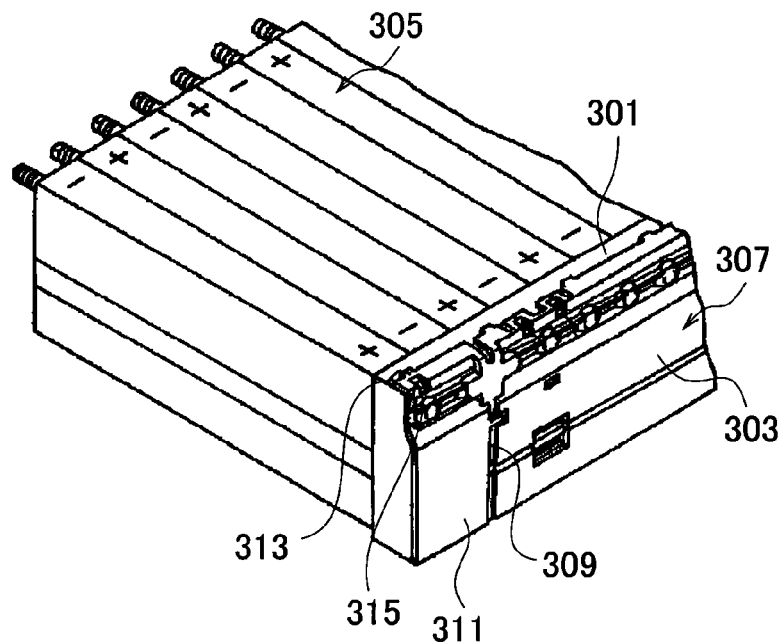
FIG. 13 is a perspective view of a conventional example, showing how a bus bar module is installed in a battery assembly.
Figure 14:
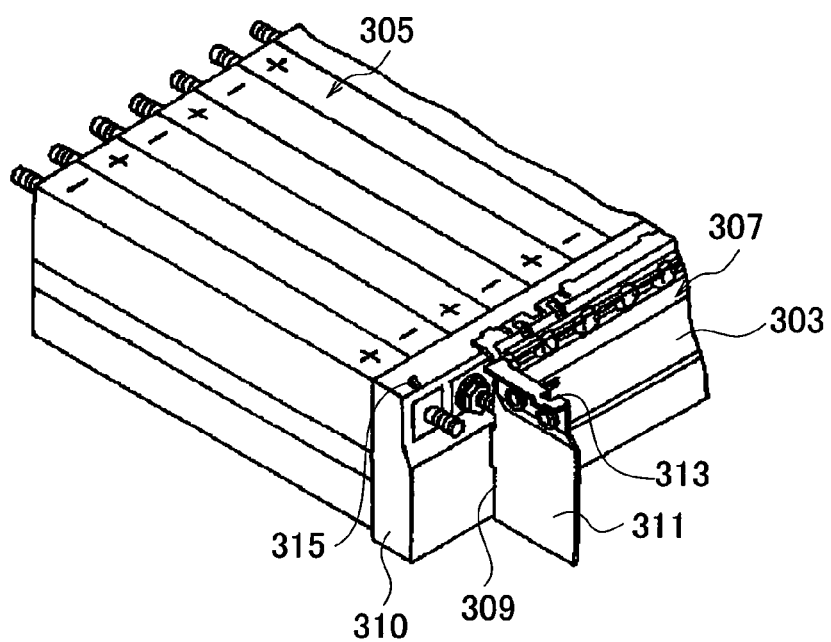
FIG. 14 is another perspective view of the conventional example, showing how the bus bar module is installed in the battery assembly.

Let us explain in detail using FIG. 11. The bus bar module 1 of the embodiment of the present invention makes the output terminal installation section 13 less likely to deform as a result of the increased values representing the second moments of area of the cross sections of the output terminal installation section 13 and the reinforcing section 31 which come from the existence of the output terminal installation section ribs 35 and the reinforcing section ribs 39 between the plate-shaped output terminal installation section body section 33 and the plate-shaped reinforcing section body section 37 as shown in FIG. 11(*a*). On the other hand, if no reinforcing section is provided there, even the increased heights of the output terminal installation section ribs 35 as shown in FIG. 11(*b*) cannot make the value representing the second moment of area of the cross section of the output terminal installation section larger than the values representing the second moments of area of the cross sections in the case shown in FIG. 11(*a*).

In addition, the bus bar module 1 makes some ribs 35A of the output terminal installation section ribs 35 and some ribs 39A of the reinforcing section ribs 39 securely come into contact with each other even if the reinforcing section 31 is more or less displaced with respect to the output terminal installation section 13, since: the extending directions of some ribs 35A of the output terminal installation section ribs 35 and the extending directions of some ribs 39A of the reinforcing section ribs 39 are orthogonal to each other; and when the second module body section 5 is installed on the first module body section 3, the parts of some ribs 35A of the output terminal installation section ribs 35 and the parts of some ribs 39A of the reinforcing section ribs 39 are designed to come into contact with each other. Accordingly, the bus bar module 1 makes it yet easier for the cover latch section 23 of the output terminal cover 19 to come into engagement with the cover latching section 27 of the output terminal installation section 13.

The invention claimed is:

1. A bus bar module installed and used in a battery assembly in order to connect batteries of the battery assembly in series, comprising:
    a first module body section provided with an output terminal installation section on which to install an output terminal;
    a second module body section detachably attached to the first module body section;
    an output terminal cover provided to the first module body section using a hinge section, and configured to cover the output terminal installed on the output terminal installation section;
    a cover latch section provided to the output terminal cover;
    a cover latching section provided to the output terminal installation section of the first module body section, the cover latch section of the output terminal cover being fastened to the cover latching section when the output terminal cover covers the output terminal installed on the output terminal installation section; and
    a reinforcing section provided to the second module body section and configured to come into engagement with the output terminal installation section when the second module body section is installed on the first module body section, and to prevent deformation of the output terminal installation section when the cover latch section is fastened to the cover latching section.

2. The bus bar module according to claim 1, wherein
the output terminal installation section is shaped like a plate,
the reinforcing section is also shaped like a plate,
the reinforcing section is designed to overlap the output terminal installation section when the second module body section is installed on the first module body section, and the bus bar module is designed such that a direction of reaction force which the output terminal installation section receives from the output terminal cover when the cover latch section is fastened to the cover latching section coincides with a thickness direction of each of the output terminal installation section and the reinforcing section, the thickness direction extending from the output terminal installation section to the reinforcing section.

3. The bus bar module according to claim 2, wherein
the output terminal installation section includes
    an output terminal installation section body section shaped like a flat plate, and
    output terminal installation section ribs projecting from the output terminal installation section body section,
the reinforcing section includes
    a reinforcing section body section shaped like a flat plate, and
    reinforcing section ribs projecting from the reinforcing section body section, and
the output terminal installation section ribs and the reinforcing section ribs are deigned to come into contact with each other when the second module body section is installed on the first module body section.

4. The bus bar module according to claim 3, wherein
extending directions of at least some ribs of the output terminal installation section ribs and extending directions of at least some ribs of the reinforcing section ribs are designed to cross each other, and
parts of the at least some ribs of the output terminal installation section ribs and parts of the at least some ribs of the reinforcing section ribs are designed to come into contact with each other when the second module body section is installed on the first module body section.

* * * * *